United States Patent
Wernberg

[11] Patent Number: 5,809,771
[45] Date of Patent: Sep. 22, 1998

[54] AIRCRAFT ENGINE FUEL SYSTEM

[75] Inventor: Donald E. Wernberg, Rockford, Ill.

[73] Assignee: Woodward Governor Company, Rockford, Ill.

[21] Appl. No.: 588,656

[22] Filed: Jan. 19, 1996

[51] Int. Cl.[6] .................................................. F02G 3/00
[52] U.S. Cl. ..................................... 60/39.094; 123/447
[58] Field of Search ........................... 60/39.094, 39.06, 60/739, 39.091; 123/198 D, 447, 179.17, 179.9, 179.27

[56] References Cited

U.S. PATENT DOCUMENTS

| | | | |
|---|---|---|---|
| 2,846,845 | 8/1958 | Parker | 60/39.094 |
| 2,881,827 | 4/1959 | Roche | 60/39.094 |
| 3,033,277 | 5/1962 | Cowles | 60/39.094 |
| 3,103,229 | 9/1963 | Smith | 60/39.094 |
| 4,041,695 | 8/1977 | Harper | 60/39.094 |
| 4,118,926 | 10/1978 | Curvino | 60/39.06 |
| 4,719,749 | 1/1988 | Greune | 60/39.094 |
| 5,010,727 | 4/1991 | Cox | 60/39.06 |
| 5,339,636 | 8/1994 | Donnelly | 60/739 |
| 5,465,570 | 11/1995 | Szillat | 60/39.06 |
| 5,528,897 | 6/1996 | Halin | 60/39.094 |

Primary Examiner—Carl S. Miller
Attorney, Agent, or Firm—Leydig, Voit & Mayer, Ltd.

[57] ABSTRACT

A fuel system for a gas turbine aircraft engine including a ecology valve and a flow divider valve, both of simple and compact construction. The ecology valve is connected to the fuel manifolds supplied by the splitter valve, and serves to suction fuel from the fuel manifolds upon engine shutdown. The fuel is temporarily stored in reservoirs in the ecology valve and upon the next engine operating cycle, is returned to the manifold so that it can be burned. The splitter valve is of simplified light-weight construction and includes a single piston operated in two regions, a first for modulating primary and second flow depending on fuel pressure, and a second region for providing a fixed, port geometry determined split between the primary and secondary.

20 Claims, 8 Drawing Sheets

AIRCRAFT ENGINE FUEL SYSTEM

TECHNICAL FIELD OF THE INVENTION

The present invention relates generally to aircraft engine fuel systems and, more particularly, to an aircraft engine fuel system which operates in an environmentally clean manner.

BACKGROUND OF THE INVENTION

Every aircraft engine includes a fuel supply, a combustion chamber, and a fuel system for regulating the flow of fuel from the fuel supply to the combustion chamber. In basic gas turbine aircraft engines, the fuel system comprises a set of fuel nozzles arranged in the combustion chamber, a fuel pump for pressurizing fuel from the fuel supply, a fuel metering unit (i.e., FMU) for controlling the flow of fuel to the fuel nozzles, and a fuel manifold fluidically connecting the fuel metering unit to the fuel nozzles. Typically, the fuel metering unit comprises both a pressurizing valve for delivering fuel to the fuel nozzles upon attainment of a predetermined pressure, and a metering valve for modulating the fuel flow rate to the fuel nozzles. During engine start-up, fuel is pumped from the fuel supply to the fuel metering unit by the fuel pump and, once a sufficient start-up pressure is attained, the pressurizing valve of the fuel metering unit opens and fuel is supplied to the fuel nozzles via the fuel manifold. Thereafter, the metering valve of the fuel metering unit modulates the rate of fuel flow from the fuel supply to the nozzles. As such, a single, continuous flow path exists from the fuel metering unit, through the fuel manifold, to the fuel nozzles.

In more advanced gas turbine aircraft engines, however, the fuel system includes additional components and has multiple flow paths. For example, a dual flow path fuel system includes two sets of fuel nozzles (i.e., a primary set and a secondary set), two sets of fuel manifolds (i.e., a primary manifold and a secondary manifold), and a flow divider valve arranged downstream of the fuel metering unit. In such systems, the flow divider valve splits the flow of fuel from the fuel metering unit into two distinct flow paths, namely a primary flow path and a secondary flow path.

In dual flow path fuel systems, fuel is delivered to the primary and secondary nozzles in a predetermined and scheduled manner. For instance, during engine start-up, fuel is initially supplied only to the primary fuel nozzles. However, once the fuel from the primary fuel nozzles is burning in a steady and satisfactory manner, fuel is thereafter supplied to the secondary nozzles. Put another way, the primary flow path provides a pilot flow, or a flow which initiates the combustion process, while the secondary flow path provides a main flow, or a flow which supplements and intensifies the combustion process once the pilot flow is burning steadily.

Depending on engine requirements, many flow divider valves become structurally and operationally complex.

A major deficiency of prior art fuel systems is that residual (or excess) fuel tends to remain in the fuel manifolds after the engine has been shut-down. Although normally small in quantity, residual fuel which is not purged from the fuel manifolds can cause engine problems and/or environmental problems. For instance, if such fuel is not completely expelled from the manifolds, it tends to trickle down into the still hot combustion chamber which causes the engine nozzles to coke and/or the engines to smoke. Thus, in application, it is desirable to completely purge the manifolds of residual fuel either during or immediately after engine shut-down.

Presently, only a handful of approaches are used to purge excess fuel from the fuel manifolds of aircraft engines fuel systems. One approach involves draining excess fuel directly onto the ground. This first approach, however, is no longer acceptable from an environmental standpoint. Another approach involves draining excess fuel into an accessory container attached to the engine. This second approach, however, is both labor intensive and time consuming. A more sophisticated approach would put the fuel into the separate container using various additional components and add a means to syphon the fuel from the container back to the tank using a control system that could include a solenoid valve to activate it. A further approach involves using air pressure to blow excess fuel into the combustion chamber while the engine is winding down. Although this approach reduces coking, it does not prevent the engine from producing a smoke pollutant after shut-down.

OBJECTS AND SUMMARY OF THE INVENTION

In view of the foregoing, it is a general aim of the present invention to provide an aircraft engine fuel system which automatically removes fuel from the fuel manifolds upon engine shut-down in a simple manner, without producing an environmentally objectionable disposal problem.

In accomplishing that aim, it is an object of the present invention to provide a fuel system which removes fuel from the fuel manifolds before it can drain into the combustion chamber.

It is a related object of the present invention to provide a fuel system which removes fuel from the fuel manifolds without the assistance of a maintenance worker or additions of more complex hardware.

Stated differently, an object of the present invention is to provide a fuel system which automatically removes fuel from the fuel manifolds upon engine shut-down and which temporarily stores that fuel until the engine is subsequently started for the next flight whereupon it is burned.

In achieving those objects, it is a feature of the present invention to provide a device which removes fuel from the fuel manifolds as the engine is shutting-down, which stores the removed fuel during periods of engine inactivity, and which returns the stored fuel to the fuel manifolds for eventual combustion during the next engine operating cycle.

It is also a feature of the present invention to provide a device having the foregoing characteristics which operates in a safe and ecological manner.

It is another general aim of the present invention to provide a simplified flow divider valve which is simple in construction and has less component parts than prior art flow divider valves.

These and other features and advantages of the invention will become apparent upon reading the following description of a preferred exemplified embodiment of the invention, and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the appended claims.

DETAILED DESCRIPTION OF THE PREFERRED EMBODIMENT

Figure 1:
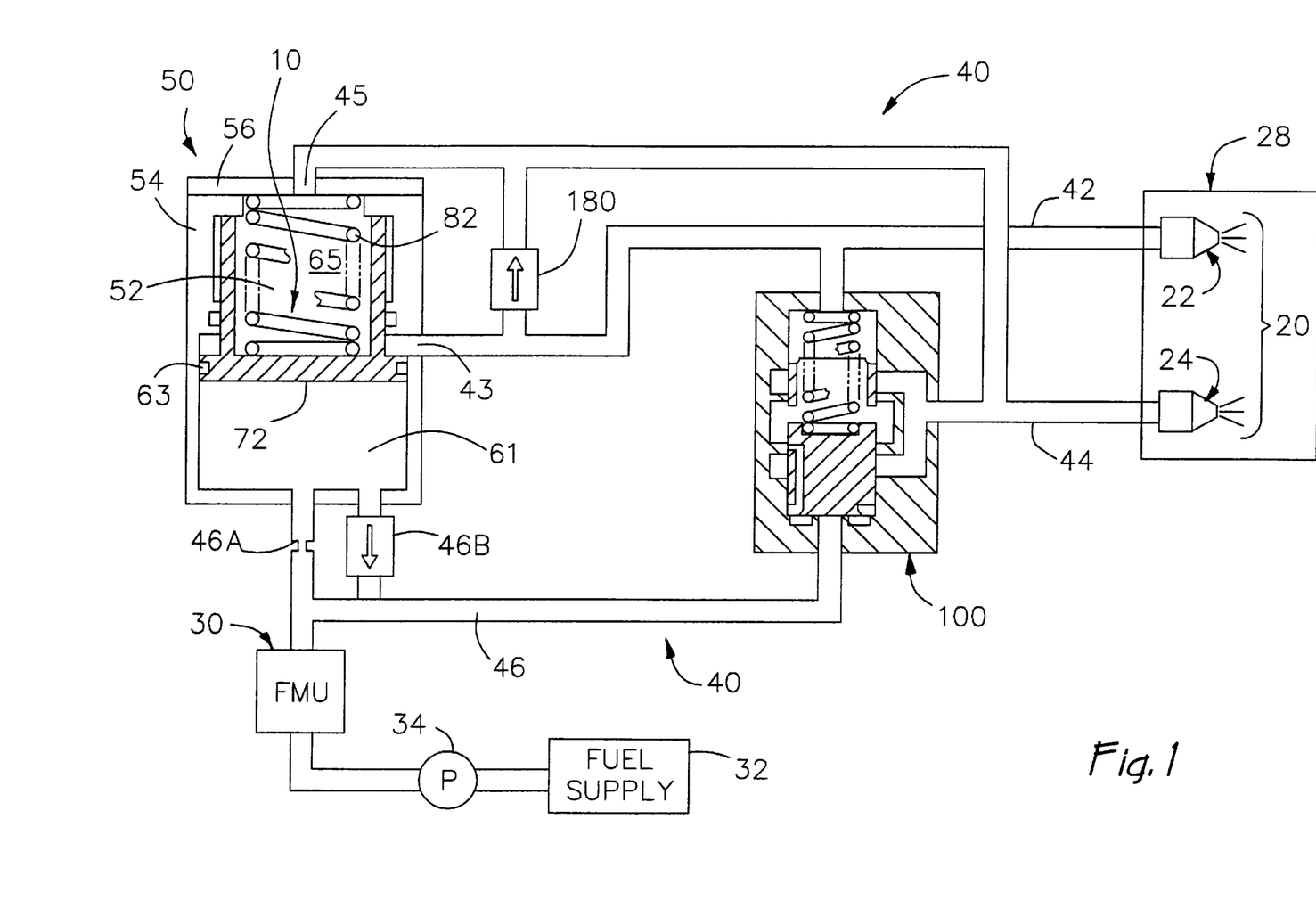
FIG. 1 is a schematic representation of an aircraft engine fuel system constructed in accordance with the present invention, including an ecology valve and a flow divider valve.

Referring now to the drawings, FIG. 1 shows a schematic representation of an aircraft engine fuel system constructed in accordance with the teachings of the present invention. Although the present invention is intended for use in smaller aircraft engines, such as helicopter engines, it will be appreciated by those skilled in the art that the inventive concepts discussed herein may also be applied to larger aircraft engines.

As illustrated in FIG. 1, the fuel system described herein generally comprises a plurality of fuel nozzles 20 arranged in a combustion chamber 28, a fuel metering unit 30, and a fuel manifold 40 disposed therebetween. It will be understood by those skilled in the art that the fuel metering unit 30 includes a pressurizing valve (not shown) which delivers fuel to the fuel nozzles 20 once a predetermined start-up pressure is attained, and a metering valve (not shown) which modulates the fuel flow rate to the fuel nozzles 20 thereafter. It will also be understood that the fuel manifold 40 comprises any means which provides a fluidic connection between the fuel metering unit 30 and the fuel nozzles 20.

For the purpose of describing the preferred embodiment of the present invention, a dual flow path fuel system will be discussed herein. As depicted in FIG. 1, the dual flow path fuel system of the preferred embodiment generally comprises: a flow divider valve 100 arranged downstream of the fuel metering unit 30 for splitting the flow of fuel into a primary 42 and a secondary 44 flow path; a set of primary and secondary fuel nozzles 22, 24 arranged downstream of the flow divider valve 100; and primary and secondary fuel manifolds 42, 44 disposed downstream of the flow divider valve 100. Accordingly, the illustrated fuel manifold 40 is split into three distinct portions—namely, the primary fuel manifold 42 (i.e., the portion between the flow divider valve 100 and the primary fuel nozzles 42), the secondary fuel manifold 44 (i.e., the portion between the flow divider valve 100 and the secondary fuel nozzles 44), and a fuel line 46 (i.e., the portion between the fuel metering unit 30 and the flow divider valve 100).

Although a dual flow path fuel system is specifically described herein, it will be readily appreciated by those skilled in the art that, a fuel system having a single or more than two flow paths could alternatively be used. of course, a single flow path fuel system would not require a flow divider valve 100, and a fuel system having more than two flow paths would require a flow divider valve 100 capable of splitting the flow of fuel into the appropriate number of flow paths.

In accordance with certain objects of the present invention, an ecology valve 50 is provided for removing (or suctioning) fuel from the fuel manifolds 42, 44 upon engine shut-down, for storing the removed fuel during periods of engine inactivity, and for delivering (or returning) the stored fuel to the fuel manifolds 42, 44 during the next engine operating cycle. In particular, the ecology valve 50 of the present invention broadly comprises a reservoir or sump 53 preferably arranged as separate reservoirs (or sumps) 63 and 65, and a reservoir control means 70 associated with the reservoirs 63 and 65. As shown in FIG. 1, the ecology valve 50 is fluidically connected to the primary and secondary fuel manifolds 42, 44 for suction fuel from these lines. The ecology valve 50 is also preferably connected to the fuel supply line 46 which provides an indication of the operating state of the engine and assists in controlling the ecology valve.

Figure 2:
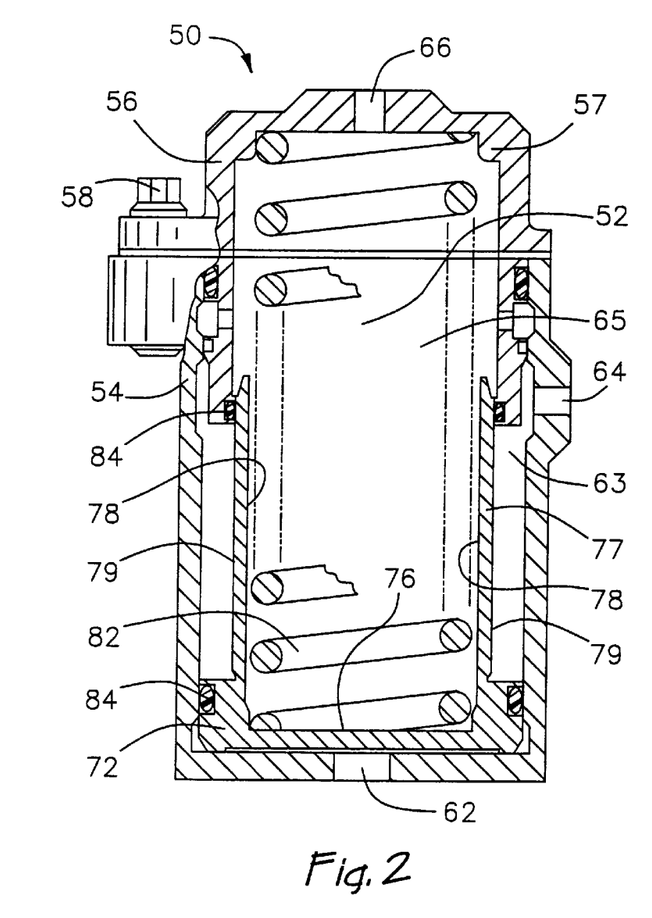
FIG. 2 is an enlarged cross-sectional view of the ecology valve of the present invention with the reciprocating piston of the ecology valve in an unloaded position (i.e., a position corresponding to engine shut-down)
Figure 3:
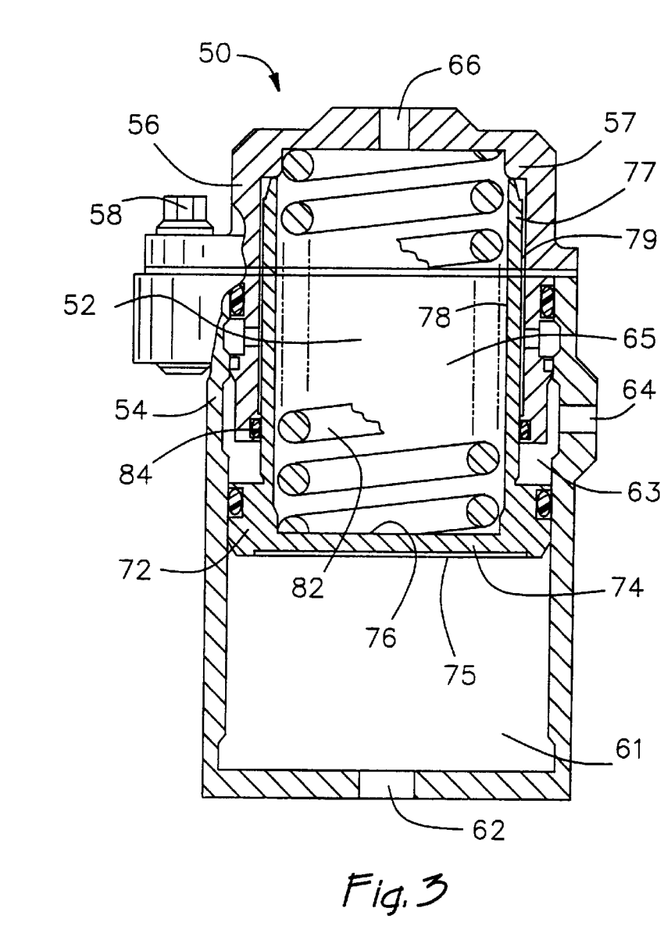
FIG. 3 is an enlarged cross-sectional view of the ecology valve of the present invention with the reciprocating piston of the ecology valve in a loaded position (i.e., a position corresponding to full engine operation)

The reservoirs 63 and 65 have a pair of inlets 43, 45 connected to the primary and secondary manifolds 42, 44, respectively. The reservoirs 63 and 65 are closed pressurized chambers such that during normal engine operation, they have no effect on fuel flow in the manifolds 42, 44. However, upon engine shutdown, the reservoirs 63 and 65 have the capacity to expand in such a way as to create a negative pressure or suction at the inlets 43, 45 and thereby withdraw fuel from the manifolds 42, 44 which would otherwise remain in the manifolds or drain through the nozzles into the engine. For purposes of controlling the condition of the reservoirs 63 and 65, the ecology valve 50 is provided with a flow control mechanism 70. The flow control mechanism provides a means for alternatively removing fuel from the fuel manifolds 42, 44 upon engine shutdown and for returning fuel to the manifolds 42, 44 upon engine start-up. In the illustrated embodiment such means includes: (1) a reciprocating piston 72 slidably disposed in a pressure sensing chamber 61 of the ecology valve 50 and movable between an unloaded position, as shown in FIG. 2, and a loaded position, as shown in FIG. 3; and (2) a spring 82 for biasing the piston 72 toward the unloaded position.

In practicing the present invention, the movement of the piston 72 between the unloaded and loaded positions controls the removal of fuel from and the delivery of fuel to the manifolds 42, 44 during the various stages of engine operation. For instance, when the engine is completely shut-down (or inoperative), the biasing provided by the spring 82 keeps the piston 72 in the unloaded position, as depicted in FIG. 2. However, when the pressure in the fuel line 46 reaches a predetermined level during engine start-up, the biasing provided by the spring 82 is overcome by the pressure in the pressure chamber 61, and the piston 72 is urged from the unloaded position, as depicted in FIG. 2, to the loaded position, as depicted in FIG. 3. When this occurs, the fuel in first and second storage chambers 63, 65 is expelled into the primary and secondary fuel manifolds 42, 44, respectively, for eventual combustion. As long as the engine is operating at any normal engine running capacity (i.e., as long as the pressure in the fuel line 46 is above the aforementioned predetermined level), the piston 72 is maintained in the loaded position. Ultimately, however, when the pressure in the fuel line 46 drops below the aforementioned predetermined level during engine shut-down, the piston 72 returns to the unloaded position and the fuel in the primary and secondary fuel manifold 42, 44 is drawn (i.e., suctioned) into first and second storage chambers 63, 65, respectively. In this way, the fuel remaining in the fuel manifolds 42, 44 upon engine shut-down is stored in the storage chambers 63, 65 during periods of engine inactivity. Although a pressure actuated flow control mechanism 70 is specifically described herein, it will be appreciated by those skilled in the art that an alternative flow control mechanism 70 could be used, including, but not limited to, a flow control mechanism 30 responsive to electronic signals from the engine.

In the illustrated embodiment, the ecology valve 50 comprises a body 54, a cover 56, and at least one bolt 58 for fastening the body and cover 54, 56 together. The valve, however, could alternatively be made up of more or fewer component parts, provided that an adequate seal is provided between the pressure chamber 61 and first and second storage chambers 63, 65, as the piston 72 is moved between the unloaded and loaded positions. In the illustrated embodiment, a plurality of O-rings 84 is used to provide such a seal.

As described briefly above, the reservoir control mechanism 70 of the illustrated embodiment includes a reciprocating piston 72 slidably disposed within the reservoir 52 and a spring 82 for biasing the piston 72 toward the unloaded position. The piston 72 comprises a face portion 74 and an annular skirt portion 77. More specifically, the face portion 74 includes a pressure face 75 and a second surface 76, and the annular skirt portion 77 includes an inner surface 78 and an outer surface 79. As clearly illustrated in FIGS. 2 and 3 of the drawings, the annular skirt portion 77 protrudes perpendicularly outwardly from the second surface 76 of the face portion 74. The spring 82, meanwhile, is compressibly disposed between a flange 57 formed on the cover 56 and the second surface 76 of the face portion 74 of the piston 72.

In use, the piston 72 is movable between the unloaded position and the loaded position. Specifically, when the piston 52 is in the unloaded position, the pressure face 75 of the piston 72 is position adjacent the body 54 of the valve 50, as shown in FIG. 2. When the piston 72 is in the loaded position, the skirt portion 77 of the piston 72 engages the flange 57 formed on the cover 56, as shown in FIG. 3. As explained more fully above, the unloaded position corresponds primarily to engine shut-down and the loaded position corresponds primarily to full engine operation.

In keeping with an important aspect of the present invention, the capacities of the reservoirs 63, 65 change as the piston 72 moves between the unloaded and loaded positions. In particular, as can be seen by comparing FIGS. 2 and 3, the relative capacities of the first and second storage chambers 63, 65 are at maximum values when the piston 72 is in the unloaded position and are at minimum values when the piston 72 is in the loaded position. Furthermore, in order to enable the ecology valve 50 to completely remove fuel from the primary and secondary manifolds 42, 44 upon engine shut-down, the first and second storage chambers 63, 65 have a maximum capacity at least equal to the capacity of the primary and secondary fuel manifolds 42, 44, respectively. In a representative helicopter engine, the maximum capacity of the primary fuel manifold 42 is approximately 0.04 pint and the maximum capacity of the secondary fuel manifold 42 is approximately 0.02 pint.

The three chambers 61, 63, 65 within the valve 50 are defined by the interaction of the piston 72 and the interior contour of the valve body. In particular, the pressure chamber 61 is defined by the inner contour of the body portion 54 and the pressure face 75 of the piston 72. The first storage chamber 63 is defined by the inner contour of the body portion 54 and the outer surface 79 of the skirt portion 77 of the piston 72. The second storage chamber is defined by the inner contour of the cover 56, the second surface 76 of the face portion 74 of the piston 72, and the inner surface 78 of the skirt portion 78 of the piston 72. In the illustrated embodiment, the first and second storage chambers 63, 65 are annular in configuration, with the second storage chamber 65 arranged inside the first storage chamber 63. Specifically, the second storage chamber 65 is arranged inside the skirt portion 77 of the piston 72 while the first storage chamber 61 is arranged outside the skirt portion 77. In addition, the first and second storage chambers 63, 65 are arranged on one side of the face portion 74 of the piston 72 while the pressure chamber 61 is arranged on the opposite side of the face portion 74.

As most clearly depicted in FIG. 1 of the drawings, the three chambers 61, 63, 65 of the ecology valve 50 are fluidically connected to the fuel manifold 40 via ports 62, 64, 66. The fuel manifold ports 43, 45 can be sized to provide the effect of a flow restricting orifice, to smoothly suction fuel from the manifold, or to return fuel to the manifold. As an alternative, a restricting orifice 46A, schematically illustrated in the diagram of FIG. 1, is interposed between the fuel line 46 and the pressure chamber 61. The orifice 46A serves to limit the rate of piston movement. Thus, when the engine is first operated, and the fuel metering unit 30 begins to supply fuel to the manifold, the increasing pressure forces fuel through the orifice 46A into the pressure chamber 61 at a rate which gradually raises the piston to return the fuel from the reservoirs which had been stored there from the previous cycle. Similarly, when the engine is shut down, flow through the fuel metering unit 30 ultimately stops, so that pressure in the fuel line 46 reduces toward zero. Fuel in the pressure chamber 61 is drained into the fuel line by action of the spring 82 forcing the piston 74 downwardly. The rate of travel is limited by the rate at which the fuel in the chamber 61 can be passed through the orifice 46A. The slow movement of the piston in turn causes a negative pressure at the ports 43, 45 which serves to draw or suction fuel from the manifolds 42, 44 into the reservoirs as they increase in size with piston movement. In the case where the manifolds must be emptied more rapidly, a low pressure check valve 46B allows the fuel to flow out of chamber 61 at a more rapid rate than it flows in.

In the fuel system of the present invention, in addition to the ecology valve described in detail above, a single piston and light-weight flow divider valve is connected to the primary and secondary manifolds and to the fuel line (as is the ecology valve) and serves to split the flow in the main fuel line 46 between the primary and second manifolds. As illustrated in FIGS. 4–9 of the drawings, the flow divider valve 100 of the present invention broadly comprises a housing 110 having a piston 140 slidably disposed therein.

In particular, the housing 110 of the flow divider valve 100 includes an inlet 112 fluidically connected to the fuel line 46, a first outlet 114 fluidically connected to the primary fuel manifold 42, and a second outlet 116 fluidically connected to the secondary manifold 44. The housing also has a first internal end 122 with a seal 124 disposed therein, a second internal end 126 arranged opposite the first internal end 122, and an internal sidewall 128 therebetween.

Figure 9:
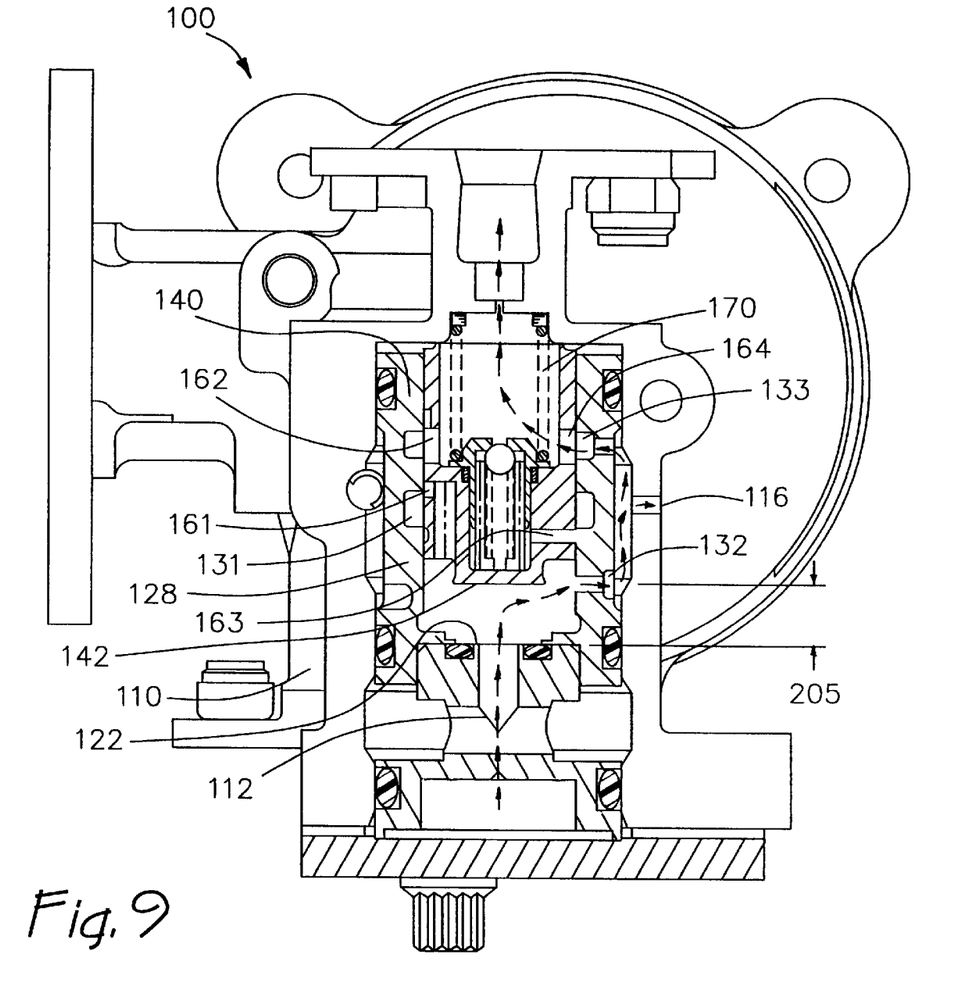

The piston 140 of the flow divider valve 100 has a forward end 142, including a small diameter surface 144 and a large diameter surface 146, and an aft end 148. Moreover, in operation, the piston 140 is movable between a deactivated position wherein the forward end 142 of the piston 140 engages the first internal end 122 of the housing 110, as shown in FIG. 4, and a fully activated position wherein the aft end 148 of the piston 140 engages the second internal end 126 of the housing 110, as shown in FIG. 9.

Figure 4:
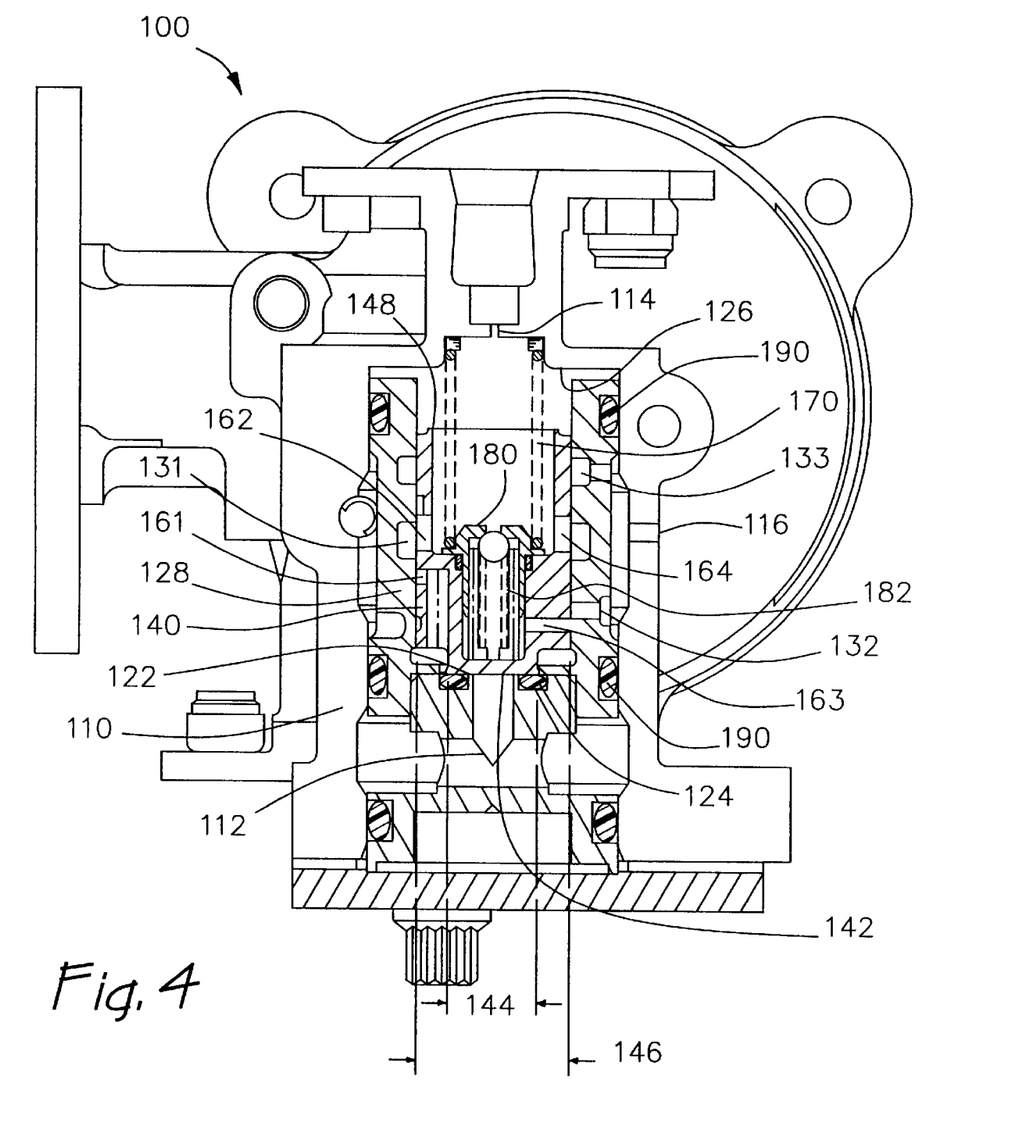
FIGS. 4–9 are enlarged cross-sectional views of the flow divider valve of the present invention showing the sequential positioning of the plunger of the flow divider valve as it moves from a deactivated position to a fully activated position.

As best shown in FIG. 4, the flow divider valve 100 has a biasing means in the form of a spring 170 which is compressibly disposed between the second internal end 126 of the housing 110 and the piston 140. In use, the spring 170 biases the piston 140 toward the deactivated position. Preferably, a series of O-rings 190 are also provided to seal the flow divider valve 100.

Figure 8:
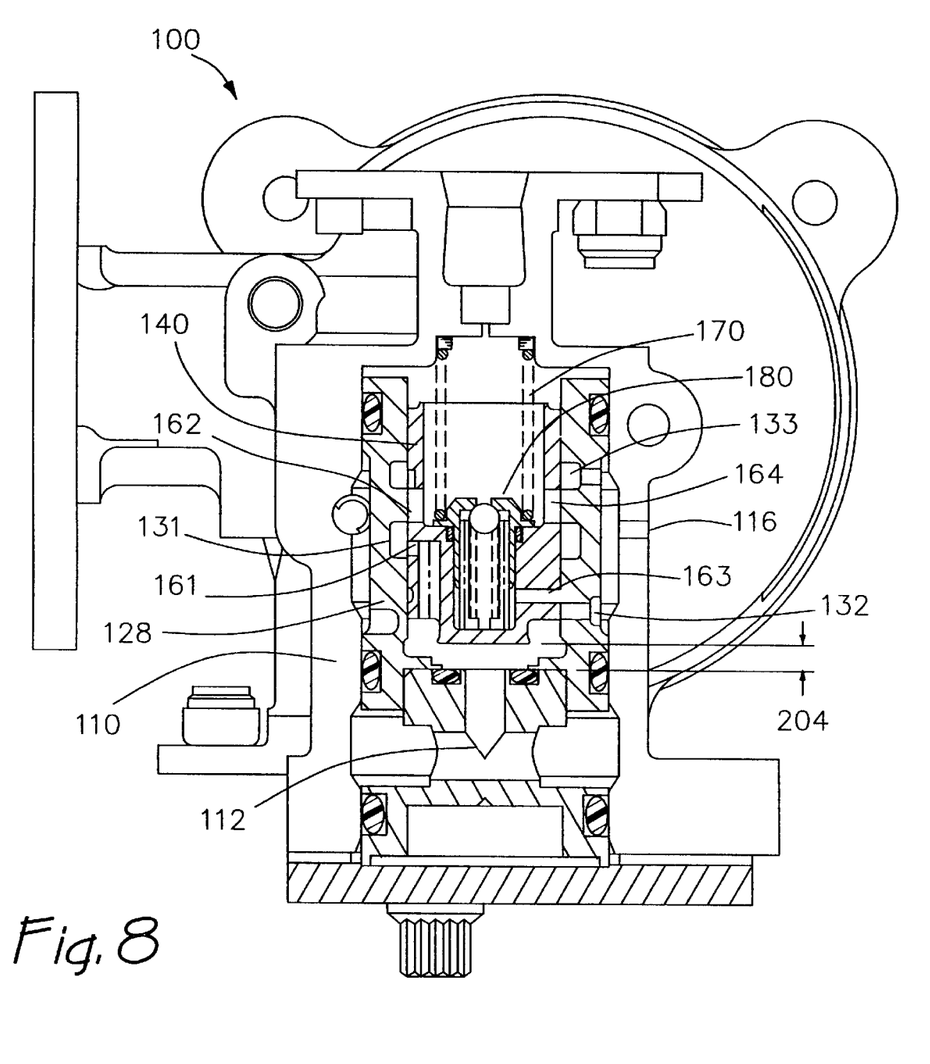

Although the flow divider valve 100 has only a single piston, it has ports which cooperate with ports in a valve body to provide two regions of operation. The first region, defined by the portions which are active in FIGS. 5 and 6 (as will be described in greater detail below), provides for a modulated split between primary and secondary manifolds at relatively low flow rates from the fuel metering unit. The flow divider valve also has means associated therewith which are activated by continued piston travel, which tend to switch the valve from operating in the first region to operating in the second region. FIG. 8 shows the valve in an intermediate position in which all ports are closed, and this is the position which rapidly translates the valve from the first region to the second region. Finally, in FIG. 9, there is shown the flow divider valve with the port positions which are active in a second region. As will also be described in greater detail below, there is no modulation with the valve operating in the second region, and the flow split between the primary and second is accomplished by the relative port sizes, in other words, by the fixed geometry of the ports in the valve. This is the normal operating condition for the engine which is achieved as flow through the fuel metering unit increases to a level consistent with normal engine operation.

Turning in greater detail to the valve structure itself, and referring, for example, to FIG. 4, a plurality of piston ports 161–164 are arranged between the forward and aft ends 142, 144 of the piston 140 and a plurality of housing ports 131–133 are arranged on the sidewall 128 of the housing 110. In use, the interaction of the piston 140 with the sidewall 128 of the housing 110 creates a series of fluidic connections between the ports 161–164 and the ports 131–133 which selectively open and close as the piston 140 is moved from the deactivated position to the fully activated position. This, in turn, causes fuel to be supplied to the primary and secondary fuel manifolds 42, 44 in a scheduled and predetermined manner. Although a specific embodiment of the flow divider valve 100 is described herein, it will be understood by those skilled in the art that the precise scheduling of fuel to the primary and secondary could easily be changed simply by modifying the number of and/or the relative positioning of the ports 161–164, 131–133.

Figure 5:
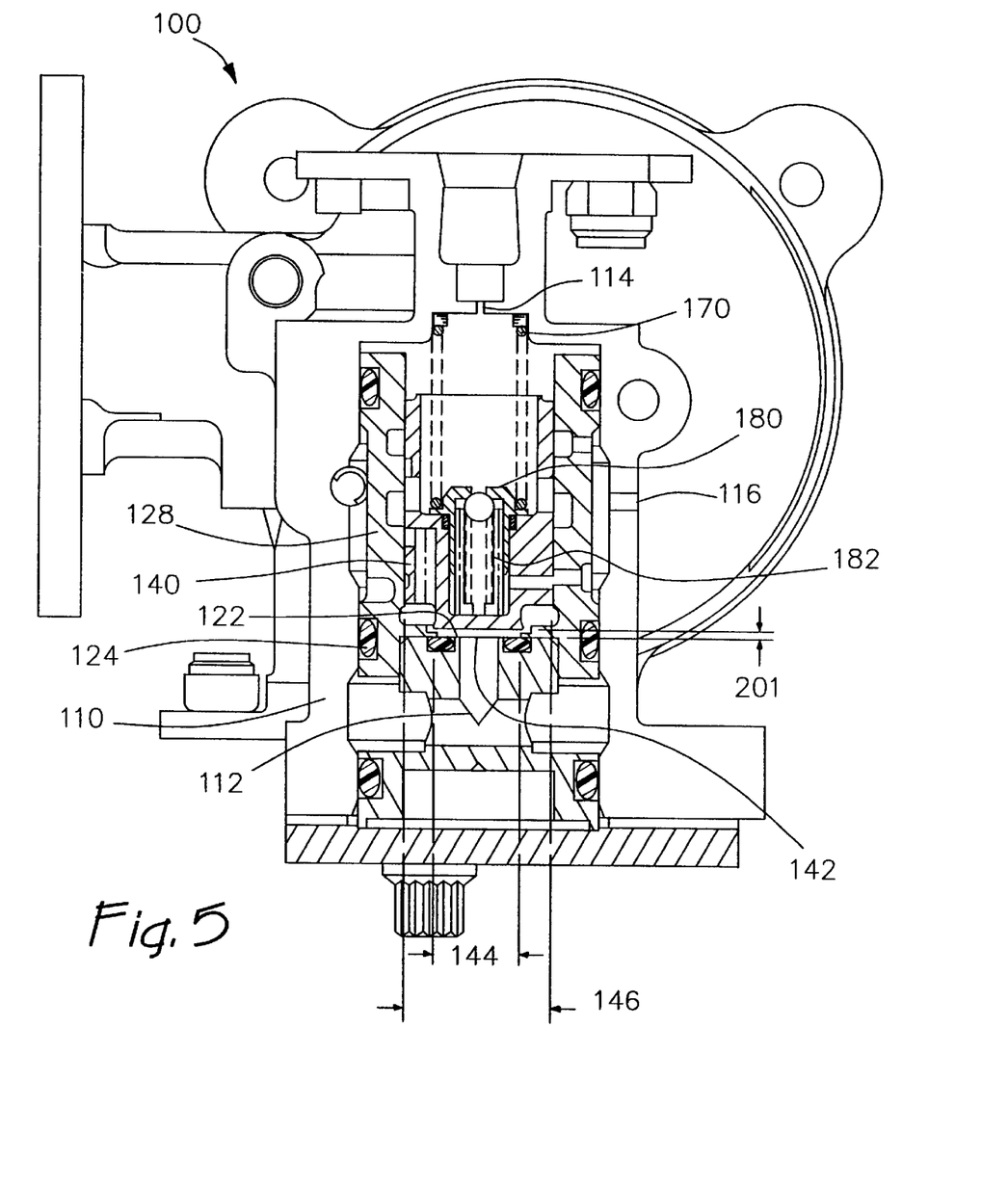

In operation, as fuel is initially supplied to the flow divider valve 100 during engine start-up, the pressure in the fuel line 46 acts on the small diameter surface 144 of the forward end 142 of the piston 140, as depicted in FIG. 4. Once the pressure in the fuel line reaches a predetermined level, the piston 140 is forced away from the first internal end 122 of the housing 110, as shown in FIG. 5. When this occurs, a small gap 201 forms between the forward end 142 of the piston 140 and the first internal end 122 of the housing 110 which allows the pressure in the fuel line 46 to act on the large diameter surface 146 of the forward end 142 of the piston 140. For ease of reference, all gaps described hereafter will pertain to the gap existing between the forward end 142 of the piston 140 and the first internal end 122 of the housing 110. In the illustrated embodiment, a pressure of approximately 70 pounds-per-square-inch ("psi") is sufficient to create the gap 201 depicted in FIG. 5.

As the pressure in the fuel line 46 increases further, the piston 140 is forced farther away from the first internal 122 end of the housing 110. In fact, once the piston 140 reaches the position denoted by gap 202 in FIG. 6, the first port 161 of the piston 140 is fluidically connected to the first port 131 of the housing 110 which, in turn, is fluidically connected to the second port 162 of the piston 140. At this time, all fuel through the flow divider valve 100 is being directed to the primary fuel nozzles 22. The portion of the flow path proceeding through the flow divider valve 100 is denoted generally by the arrows in FIG. 6.

Since all of the flow is being directed to the primary manifold 42 at this time, the differential pressure between the primary and secondary manifolds increases. Means are provided which are associated with the piston for directing part of the modulated flow from the primary to the secondary manifold. In the illustrated embodiment, such means are a pressure relief valve formed in the piston itself. As indicated in FIG. 1, an external relief valve 180 can also be used.

Figure 7:
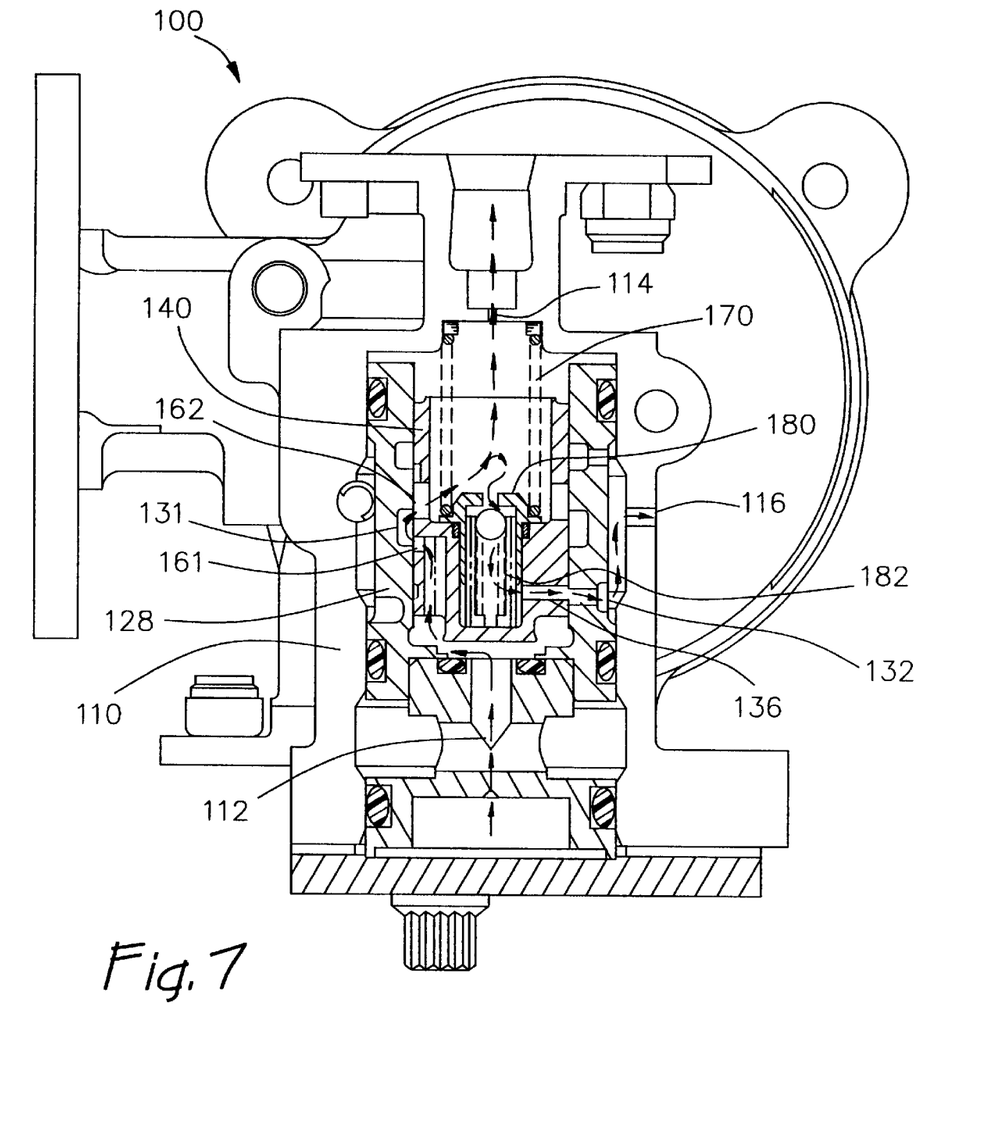

The bias point of the relief valve is set to allow flow into the secondary when the pressure differential exceeds the predetermined limit, so that when the flow divider valve is operating in its first region, and fuel pressure increases beyond a predetermined level, the flow which is modulated through the splitter valve, is also modulated (in part) through the check valve and into the secondary manifold. Thus, if flow is increased beyond a given level (as sensed by the pressure differential between the two manifolds), the relief valve serves as a means for diverting some of the modulated flow into the secondary, to begin to fire the secondary nozzles. As shown in FIG. 7, this secondary flow path branches off from the first flow path immediately after the second port 162 of the piston 140 and proceeds, in succession, through the relief valve 180, through the third port 163 in the piston 140, through the second port 132 in the housing 110, through the second outlet 116 of the housing, and to the secondary fuel manifold 44.

Figure 6:
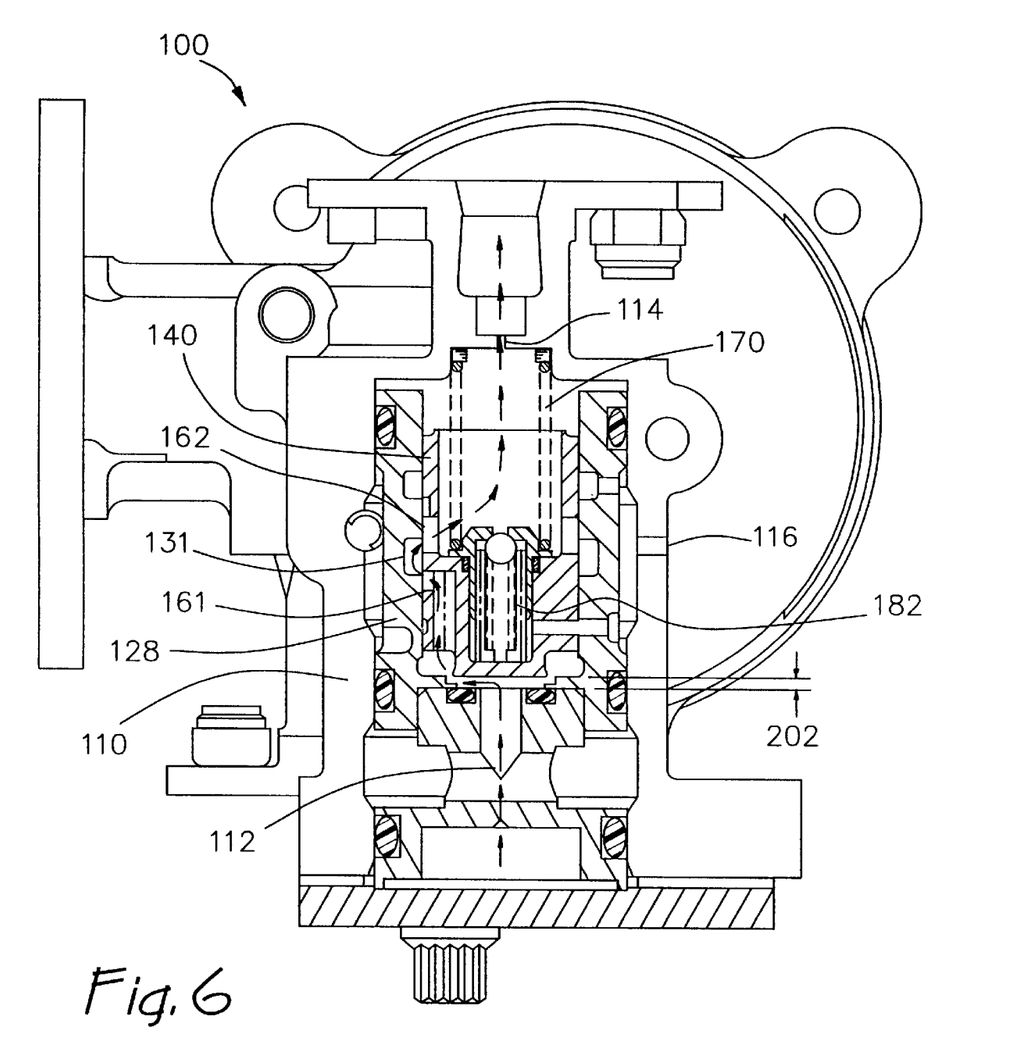

The relief valve 180, in particular, is fluidically connected to both the primary and secondary fuel manifolds 42, 44 and is operable between a closed position wherein there is no communication between the primary and secondary manifolds 42, 44, as shown in FIGS. 4–6, and an open position wherein there is communication between the primary and secondary manifolds 42, 44, as shown in FIG. 7. Pursuant to the invention, the relief valve 180 is biased in the closed position, typically by a spring 182, and is actuatable from the closed position to the open position when the pressure in the primary manifold 42 becomes sufficiently greater than the pressure in the secondary manifold 44. It will be appreciated by those skilled in the art that the relief valve 180 could either be situated outside of the flow divider valve 100 (e.g., as shown in FIG. 1) or inside the flow divider valve 100 (e.g., as shown in FIGS. 4–9). In either case, however, the relief valve 180 should divert flow to the secondary manifold 42 once a predetermined pressure differential between the primary and secondary manifolds 42, 44 is realized. In the illustrated embodiment, the relief valve 180 is actuated from the closed position to the open position at a pressure differential of approximately 120 psi.

As the fuel flow rate increases further, the piston 140 is urged still farther away from the first internal 122 end of the housing 110. In fact, once the piston 140 reaches the position denoted by gap 204 in FIG. 8, the second and third ports 162, 163 of the piston 140 are completely closed (i.e., the second and third ports 162 of the piston 140 are no longer fluidically connected to the first and third ports 131 of the housing 110, respectively). This port arrangement serves as a means activated by continued piston travel beyond the first region, to sharply translate the piston to a final operating position in the second region. Thus, when the ports are closed as described above, there is no flow to either the primary or secondary manifolds, and the check valve 180 closes. However, because the fuel pressure is still high (and is increasing) the closing of the ports to momentarily shut off fuel flow causes a brief pressure spike which sharply translates the piston 140 upwardly to the final operating position illustrated in FIG. 9. It will be noted that the pressure transition as well as the temporary interruption of flow to the fuel manifolds is without effect on the engine, because the transition is so quick. However, the port structure is a reliable means for quickly translating the piston from the first region, where the flow to the primary and secondary is modulated by the piston position, to a second operating region where the valve does not modulate flow. In the second region, the geometry of the primary and secondary ports 132, 133, 114, 116 controls the split of fuel flow to the primary and secondary. The fuel metering unit in effect produces a given fuel flow rate which is passed to the flow splitter, and that flow is split in a given proportion (such as fifty-fifty or sixty-forty, as needed by the engine), with the split being achieved by the ratio between the areas of the primary and secondary engine nozzles. Thus, in the FIG. 9 condition, there is no modulation around a given limit. The fuel flow itself is controlled by the fuel metering unit, and the split is a fixed percentage as determined by the engine nozzles in the second operating region of the flow splitter valve. This is because the splitter now opens a port 133 connecting the two manifolds to equalize the pressures.

It will be seen from comparison of FIGS. 8 and 9 that as the piston moves upwardly slightly beyond the position illustrated in FIG. 8, the main fuel flow at the lower side of the piston will pass through a port 132 and a second set of ports 133, 164. The main fuel flow through the port 132 is then split between the secondary flow into port 116 and the primary flow through port 114. Port 133 is sized to create very little drop between the secondary and primary manifolds.

By the time the piston 140 is in the fully activated position, the gap 205 between the forward end 142 of the piston 140 and the first internal end 122 of the housing 110 is at a maximum value. More importantly, however, the flow path is redirected around the forward end 142 of the piston 140 and through the second port 132 of the housing 110. At this point, the flow of fuel is also split into two distinct paths—namely, one path proceeding through the second outlet 116 of the housing 110 to the secondary fuel manifold 42, and another path proceeding through the third port 133 of the housing 110, through the fourth port 164 of the piston 140, through the first outlet 114 of the housing 110, and, finally, to the primary fuel manifold 42. Furthermore, since the primary and secondary fuel manifolds 42, 44 are fluidically connected by the fourth port 164 of the piston 164 and the third port 133 of the housing 110, the pressure in the two manifolds 42, 44 will remain approximately equal and the relief valve 180 will remain reset until the engine is shut-down.

By redefining the port locations on the divider piston and sleeve, the characteristics can be modified to meet requirements of various engines and be used in both "latching" and non-latching applications. For example, in some cases (i.e., latching applications) the pilot flow must never drop below a minimum flow level and in others (i.e., non-latching) it is reset lower when total flow reaches a given level.

When the engine is shut down, the fuel in the manifolds (and in the splitter valve) is returned to the ecology valve, as has been described in detail above.

The fuel system according to the present invention is particularly suited to a helicopter engine in that it is very compact and light in weight, utilizing only a minimum number of parts. The ecology valve adds very little weight to the engine, yet provides an important function of handling the unwanted fuel during engine shut-down. The fuel splitter valve, connected to substantially the same fuel line ports as the ecology valve, utilizes only a single piston and a ported body/piston arrangement which in effect causes the fuel splitter valve to operate in two modes. One of the modes is provided by the first region for modulated flow split between the primary and secondary, where the modulation is achieved by the pressure and flow rate in the incoming fuel line. In addition to that, the valve, although being simple in construction, has a second operating region in which a relatively conventional fixed geometry standard split is achieved in the same valve structure.

While a particular embodiment of the present invention have been described herein, it will be understood, of course, that the invention is not strictly limited thereto. Since modifications may be made to the disclosed structures by those skilled in the art without departing from the essence of the invention, the appended claims are intended to cover all structures, regardless of modifications, that fall within the scope and spirit of the present invention, whether or not such structures are specifically described herein.

What is claimed is:

1. A fuel system for use in an aircraft engine, the fuel system comprising:

a fuel pump for pressurizing fuel from a fuel supply, a plurality of fuel nozzles arranged in a combustion chamber, a fuel metering unit for controlling the flow of fuel from the fuel pump to the fuel nozzles, a fuel manifold fluidically connecting the fuel metering unit to the fuel nozzles, and an ecology valve fluidically connected to the fuel manifold, the ecology valve having a reservoir for temporary storage of fuel, and reservoir control means for suctioning sufficient fuel into the reservoir to prevent coking of the nozzles upon engine shutdown for temporary storage and return of the temporarily stored fuel for combustion in the next engine operating cycle.

2. The fuel system as defined in claim 1, wherein:

the reservoir has sufficient capacity to receive and temporarily store a volume of fuel at least equal to the volume of fuel remaining in the fuel manifold upon engine shut-down; and the reservoir control means varies the volume of the reservoir to suction fuel from the manifold upon engine shut-down and to return of fuel to the fuel manifold upon engine start-up.

3. The fuel system as defined in claim 2, further comprising:

a flow divider valve arranged downstream of the fuel metering unit; and wherein:

the fuel nozzles comprise a primary set and a secondary set;

the fuel manifold comprises a primary manifold and a secondary manifold, the primary manifold fluidically connecting the flow divider valve to the primary set of fuel nozzles and the secondary manifold fluidically connecting the flow divider valve to the secondary set of fuel nozzles; and the reservoir comprises first and second storage chambers fluidically connected to the primary and secondary fuel manifold, respectively.

4. The fuel system as defined in claim 3, wherein the first storage chamber accommodates a volume of fuel equal to the capacity of the primary fuel manifold and the second storage chamber accommodates a volume of fuel equal to the capacity of the secondary fuel manifold.

5. The fuel system as defined in claim 3, wherein the reservoir control means comprises a pressure chamber in the ecology valve having a control port connected to the fuel metering unit to sense pressure in the fuel supply, and pressure sensing means in the pressure chamber for returning fuel to the manifold when the fuel pressure is high and suctioning fuel from the manifold as the fuel pressure decreases on engine shutdown.

6. The fuel system as defined in claim 5, wherein the pressure responsive means includes a piston having an operating face disposed in the pressure chamber and an opposite face defining the reservoirs, a skirt portion carried by the opposite face to divide the reservoir into two separate chambers for the primary and secondary manifolds.

7. The fuel system as defined in claim 6, wherein the reservoir control means further includes spring means for biasing the piston in a direction to fill the reservoirs, the pressure chamber being disposed opposite the spring for overcoming the bias to expel fuel from the reservoirs as the fuel pressure increases upon engine start up.

8. The fuel system as defined in claim 7, wherein the reservoir control means slowly translates the piston to slowly expand the reservoirs and create a suctioning effect adequate to draw fuel from the respective manifolds.

9. The fuel system as defined in claim 8, including orifice in the connections between the manifolds and the respective reservoirs for controlling the rate of fuel transfer into and out of the reservoirs, and a further flow control orifice between the fuel line and the pressure chamber for controlling the rate of piston travel.

10. The fuel system as defined in claim 3, wherein the flow divider valve includes:
    a flow divider valve body and a ported piston mounted for translation in the valve body;
    means biasing the ported piston to a quiescent condition in which flow to the primary and secondary manifolds is shut off;
    the body and ported piston establishing two operating regions for the flow divider valve;
    ports in the body and piston effective with the piston in the first region for modulating primary flow as a function of inlet fuel pressure;
    a relief valve in the piston for diverting a portion of the modulated primary flow to the secondary as a function of the pressure differential in the primary and secondary manifolds;
    means activated by continued piston travel from the first toward the second regions for sharply translating the piston to a final operating position in the second region; and
    ports in the body and piston effective with the piston in the second region for providing a fixed unmodulated split of flow through the divider valve to the primary and second manifolds.

11. An ecology valve for use in an aircraft engine fuel system, the fuel system comprising a fuel pump for pressurizing the fuel in a fuel supply, a fuel metering unit for modulating the fuel flow rate from the fuel supply to a primary and secondary set of fuel nozzles, and a primary and secondary fuel manifold fluidically connecting the fuel metering unit to the primary and secondary fuel nozzles, respectively, the ecology valve comprising:
    a valve body;
    a pressure actuated piston slidably disposed within the valve body and movable between an unloaded position corresponding to engine shut-down and a loaded position corresponding to engine operation, the piston having a pressure face on one side and an annular skirt on the other side;
    spring means for biasing the piston toward the unloaded position;
    the valve body cooperating with the skirt portion of the piston to create a first and second storage reservoir separated by the skirt portion and connected to the primary and secondary manifolds, respectively, translation of said piston sensing to increase or decrease the size of the respective reservoirs for accepting fuel from or returning fuel to the respective manifolds;
    the valve body and pressure face of the piston creating a pressure chamber fluidically connected to the fuel metering unit for responding to the pressure level in the fuel supply; and
    whereby movement of the piston from the loaded position to the unloaded position during engine shut-down suctions fuel from the primary and secondary manifolds to the first and second storage chambers, respectively, and movement of the piston from the unloaded position to the loaded position during engine start-up drives fuel from the first and second storage chambers to the primary and secondary fuel manifolds, respectively.

12. A flow divider valve for use in an aircraft engine fuel system, the fuel system comprising a fuel pump for pressurizing fuel from a fuel supply, a primary and a secondary set of fuel nozzles arranged in a combustion chamber, a fuel metering unit for controlling the flow of fuel from the fuel pump to the fuel nozzles, primary and secondary fuel manifolds fluidically connecting the flow divider valve to the primary and secondary fuel nozzles, respectively, and a fuel line fluidically connecting the fuel metering unit to the flow divider valve, the flow divider valve comprising, in combination:
    a flow divider valve body and a ported piston mounted for translation therein;
    means biasing the ported piston to a quiescent condition in which flow to the primary and secondary manifolds is shut off;
    the body and ported piston establishing two operating regions for the valve;
    ports in the body and piston effective with the piston in the first region for modulating primary flow as a function of inlet fuel pressure;
    a relief valve for bypassing the piston for diverting a portion of the modulated primary flow to the secondary as a function of the pressure differential in the primary and secondary manifolds;
    means activated by continued piston travel from the first toward the second regions for sharply translating the piston to a final operating position in the second region; and
    ports in the body and piston effective with the piston in the second region for providing a fixed unmodulated split of flow through the divider valve to the primary and second manifolds.

13. The flow divider valve as defined in claim 12, wherein the relief valve comprises a spring biased relief valve formed in the face of the piston for porting fuel through the face of the piston when the differential between the primary and second manifolds exceeds the pressure exerted by the spring bias.

14. The flow divider valve as defined in claim 12, wherein the relief valve is a separate valve interconnected between the primary and secondary manifolds.

15. The flow divider valve as defined in claim 12, wherein the means activated by continued piston travel comprises a porting arrangement between the first and second regions which temporarily interrupts primary flow to thereby temporarily increases pressure driving the piston to the second region.

16. The flow divider valve as defined in claim 15 wherein the porting arrangement between the first and second regions is positioned to equalize pressure in the primary and secondary manifolds whenever pressure in the secondary manifold attempts to exceed pressure in the primary manifold.

17. The flow divider valve as defined in claim 15 wherein the porting arrangement between the first and second regions is positioned to provide a minimum flow in the primary manifold under all conditions of discharge flow.

18. A method for ecologically regulating fuel flow in an aircraft engine fuel system, the fuel system comprising a fuel pump for pressurizing fuel from a fuel supply, a plurality of fuel nozzles arranged in a combustion chamber, a fuel metering unit for controlling the flow of fuel from the fuel pump to the fuel nozzles, and a fuel manifold fluidically connecting the fuel metering unit to the fuel nozzles, the method comprising the steps of:

providing a temporary sump connected to the fuel manifold;

suctioning sufficient fuel into the sump upon engine shut-down to prevent coking of the nozzles;

temporarily storing the fuel in the sump while the engine is inoperative; and returning the stored fuel from the sump to the fuel system during the next engine start-up.

19. A fuel system for use in an aircraft engine, the fuel system comprising:

a fuel pump for pressurizing fuel from a fuel supply, a plurality of fuel nozzles arranged in a combustion chamber, a fuel metering unit for controlling the flow of fuel from the fuel pump to the fuel nozzles;

a fuel manifold fluidically connecting the fuel metering unit to the fuel nozzles;

an ecology valve fluidically connected to the fuel manifold, the ecology valve having a reservoir for temporary storage of fuel in the manifold, reservoir control means for suctioning sufficient fuel from the manifold into the reservoir upon engine shut-down to prevent coking of the nozzles and for temporary storage and return of the temporarily stored fuel to the manifold for combustion in the next engine operating cycle;

the reservoir having sufficient capacity to receive and temporarily store a volume of fuel at least equal to the volume of fuel remaining in the fuel manifold upon engine shut-down; and the reservoir control means varying the volume of the reservoir to suction fuel from the manifold upon engine shut-down and for return of the fuel to the manifold upon engine start-up.

20. An ecology valve for use in an aircraft engine fuel system, the fuel system having a fuel pump for pressurizing the fuel in a fuel supply, a fuel metering unit for modulating the fuel flow rate from the fuel supply via a manifold to a set of fuel nozzles, the ecology valve comprising:

a reservoir connected to the fuel manifold for temporary storage of fuel; and reservoir control means for suctioning sufficient fuel into the reservoir to prevent coking of the nozzles upon engine shut-down for temporary storage and return of the temporarily stored fuel for combustion in the next engine operating cycle.

* * * * *